United States Patent [19]

Stevens

[11] Patent Number: 5,328,374

[45] Date of Patent: Jul. 12, 1994

[54] GEOMETRY BOARD

[75] Inventor: George R. Stevens, Barrie, Canada

[73] Assignee: 158973 Canada Inc., Barrie, Canada

[21] Appl. No.: 13,370

[22] Filed: Feb. 4, 1993

[51] Int. Cl.$^5$ .............................................. G09B 23/04
[52] U.S. Cl. .................................... 434/211; 434/216
[58] Field of Search ................. 434/216, 211, 212, 83, 434/214; 446/118

[56] References Cited

U.S. PATENT DOCUMENTS

| | | | |
|---|---|---|---|
| 2,883,764 | 4/1959 | Stephens | 446/118 |
| 3,594,940 | 7/1971 | Yonezawa | 446/118 |
| 4,164,091 | 8/1979 | Lin | 446/118 |
| 4,964,833 | 10/1990 | Suzuki | 446/118 |
| 4,979,749 | 12/1990 | Onanian | 434/83 X |

FOREIGN PATENT DOCUMENTS 1442602  7/1976  United Kingdom ................ 446/118

OTHER PUBLICATIONS

Pp. 18 and 19 of a 1992 catalogue published by Exclusive Educational Products of Barrie, Ontario, Canada.

Primary Examiner—Gene Mancene
Assistant Examiner—Jeffrey A. Smith
Attorney, Agent, or Firm—John C. Hunt

[57] ABSTRACT

A geometry board having pegs arranged on its top face for the demonstration of planar geometric figures by stretching of elastic bands about the pegs. The disclosed board is of clear injection-molded plastic and has a square face with the pegs arranged in a grid on the face including along edges of the board. Pegs along the edges are in the shape of semi-cylinders and the arrangement is such that a pair of boards may be located side-by-side so that the semi-cylinders are paired up so that each pair of semi-cylinders forms a single cylinder. Pegs located at the corners of the board are in the shape of quarter-cylinders so that when four corner pegs are located at the center of four boards laid side-by-side the four quarter-cylinders form a singe cylinder. When four boards are assembled together a Cartesian coordinate system is obtain with x- and y-axes along adjacent edges of the boards and point (0,0) located at the intersection of all four boards. All four edges of the board have downwardly depending walls which are crenelated so as to be capable of accommodating edge pegs of an underlying board when boards are stacked one upon the other. Further, pairs of opposite walls extend outwardly and upwardly so as to form an upwardly open trough, which trough receives one of the downwardly depending walls of another board when the boards are assembled in side-by-side relationship so as to hold the boards together.

16 Claims, 5 Drawing Sheets

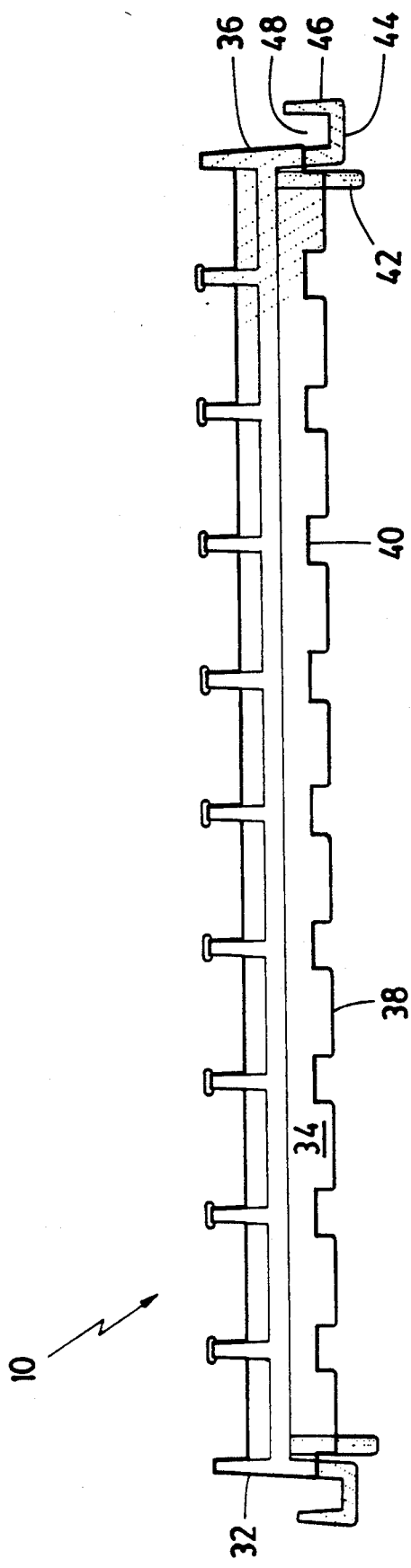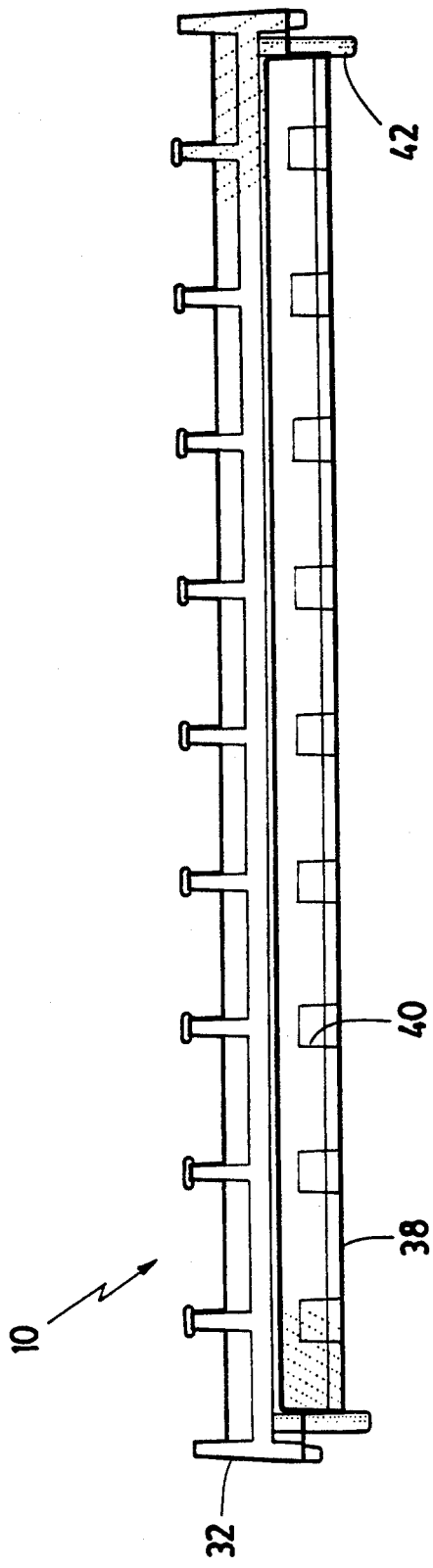

ns5,328,374

GEOMETRY BOARD

FIELD OF THE INVENTION

This invention relates to education and demonstration devices. In particular, this invention relates to a geometry board having pegs arranged on its face, the board being assemblable side-by-side with other similar boards, for use in the demonstration o#planar geometric figures and the like.

BACKGROUND OF THE INVENTION

It is common in the field of education to use devices for demonstrating mathematical concepts. Well known for many years has been a familiar type of geometry board, the pegboard, having pegs arranged on its front or top face. Strings may be tied or elastic bands looped around a number of pegs to obtain various geometric figures such as a line, a triangle, a thombus, etc. and various combinations thereof.

In a classroom setting it may be desirable to have a children work individually or together in groups with these boards. As such, it is advantageous for a board to be adaptable for either usage.

A known board is of injection-molded plastic and has integrally molded pegs or posts arranged in a grid pattern across a sqaure face of the board. The board has a short wall surrounding the square face about the height of the pegs. Such a board is available in translucent material and can thus be used in conjunction with an overhead-type projector commonly used in classrooms for demonstrations to groups of people. A number of such boards can be stacked one atop the other to show a number of overlapping or transformed figures, etc.

SUMMARY OF THE INVENTION

The present invention provides, in a broad aspect, a polygonally-shaped geometry board having a plurality of spaced apart posts arranged across its top face. There are edge posts arranged along a first edge of the board such that when a pair of boards are arranged in side-by-side relationship with the edge of a first of the pair of boards adjacent and coextensive with the edge of a second of the pair of boards, pairs of first and second of the edge posts of the first and second boards, respectively, are located in side-by-side relationship with each other such that each of the pairs of edge posts acts as a single post. Geometry boards of the present invention may thus be arranged side-by-side to expand the usable area for teaching and learning purposes.

In a further aspect, the geometry board of the present invention includes edge posts arranged along a second edge adjacent the first edge such that when a pair of boards are arranged in side-by-side relationship with the first edge of a first of the boards adjacent and coextensive with the second edge of a second of the boards, pairs of first and second of the edge posts of the first and second boards, respectively, are located in side-by-side relationship with each other such that each of the pairs of edge posts acts as a single post.

Further, the geometry board may include first and second walls which extend downwardly of the first and second edges, respectively, each wall having indentations to accommodate edge posts of an underlying board when an overlying board is stacked thereupon with one of the edges of the overlying board located to overly one of the edges of the underlying board.

Alternatively, the geometry board may further include first and second walls which extend downwardly of the first and second edges respectively, wherein the first wall extends laterally outwardly and upwardly to form a trough for receipt of the second wall of another said board for assembly of a pair of the boards when arranged in said side-by-side relationship. In such an embodiment, each wall may have indentations located to accommodate edge posts of an underlying board when an overlying board is stacked thereupon with one of said edges of the overlying board located to overly one of said edges of the underlying board.

Preferably, especially for the teaching of mathematics involving Cartesian coordinate systems, the board is rectangular and the posts are arranged in an array of points located at intersections of first and second sets of parallel lines, the first and second sets of lines being parallel to first and second orthogonal board edges, respectively.

In its most preferred aspect, the present invention is of a geometry board of a translucent injection-molded plastic having a square top face. There are upstanding posts arranged in an array of points located at intersections of first and second sets of evenly spaced apart parallel lines, the first and second sets of lines being parallel to first and second orthogonal board edges, respectively. There are edge posts arranged along each edge of the board such that when a pair of boards are arranged in side-by-side relationship with one of the edges of a first board of the pair of boards adjacent and coextensive with one of the edges of a second board of the pair of boards, pairs of first and second of the edge posts of the first and second boards, respectively, are located in side-by-side relationship with each other such that each of the pairs of edge posts acts as a single post. Further, the board most preferably includes a pair of first walls, each of which walls extends downwardly of each of parallel first board edges, respectively, and a pair of second walls. Each of the second walls extends downwardly of parallel second board edges orthogonal to the first board edges, respectively, each of the four walls has indentations to accommodate edge posts of an underlying board when an overlying board is stacked thereupon with one of said edges of the overlying board located to overly one of said edges of the underlying board. Each first wall also extends laterally outwardly and upwardly to form a trough for receipt of one of the second walls of another said board for assembly of a pair of the boards when arranged in the side-by-side relationship.

BRIEF DESCRIPTION OF THE DRAWINGS

In the drawings,

FIG. 2 is a side elevation of the preferred embodiment geometry board as viewed from the left of FIG. 1;

FIG. 3 is a side elevation of the preferred embodiment as viewed from the right of FIG. 1;

DETAILED DESCRIPTION OF A PREFERRED EMBODIMENT

Figure 1:
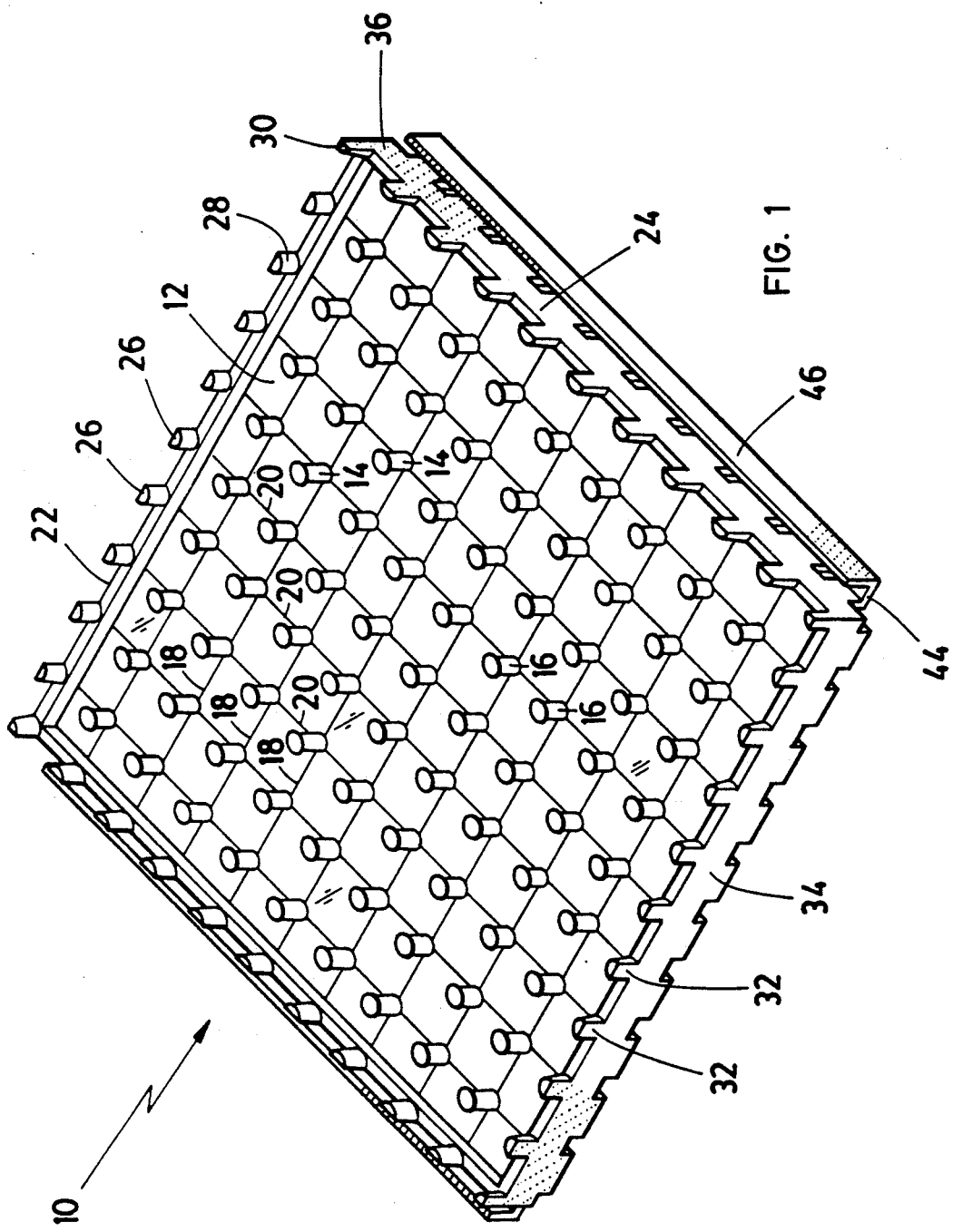
FIG. 1 is an isometric view showing the top and two sides of a preferred embodiment of the present invention.

Turning to the drawings, a preferred embodiment geometry board 10 is shown in FIG. 1. The rectangular top face 12 of the board is generally in the shape of a square. Upstanding posts 14 are located at points 16 located at intersections of parallel lines 18 and parallel lines 20. Lines 18 are parallel to board edges 22 while lines 20 are parallel to board edges 24. As illustrated, lines 18 are non-parallel to and orthogonal to board edge 24 as well as lines 20. Likewise, lines 20 are non-parallel to and orthogonal to, i.e., at right angles to, edge 22 and lines 18.

Figure 5:
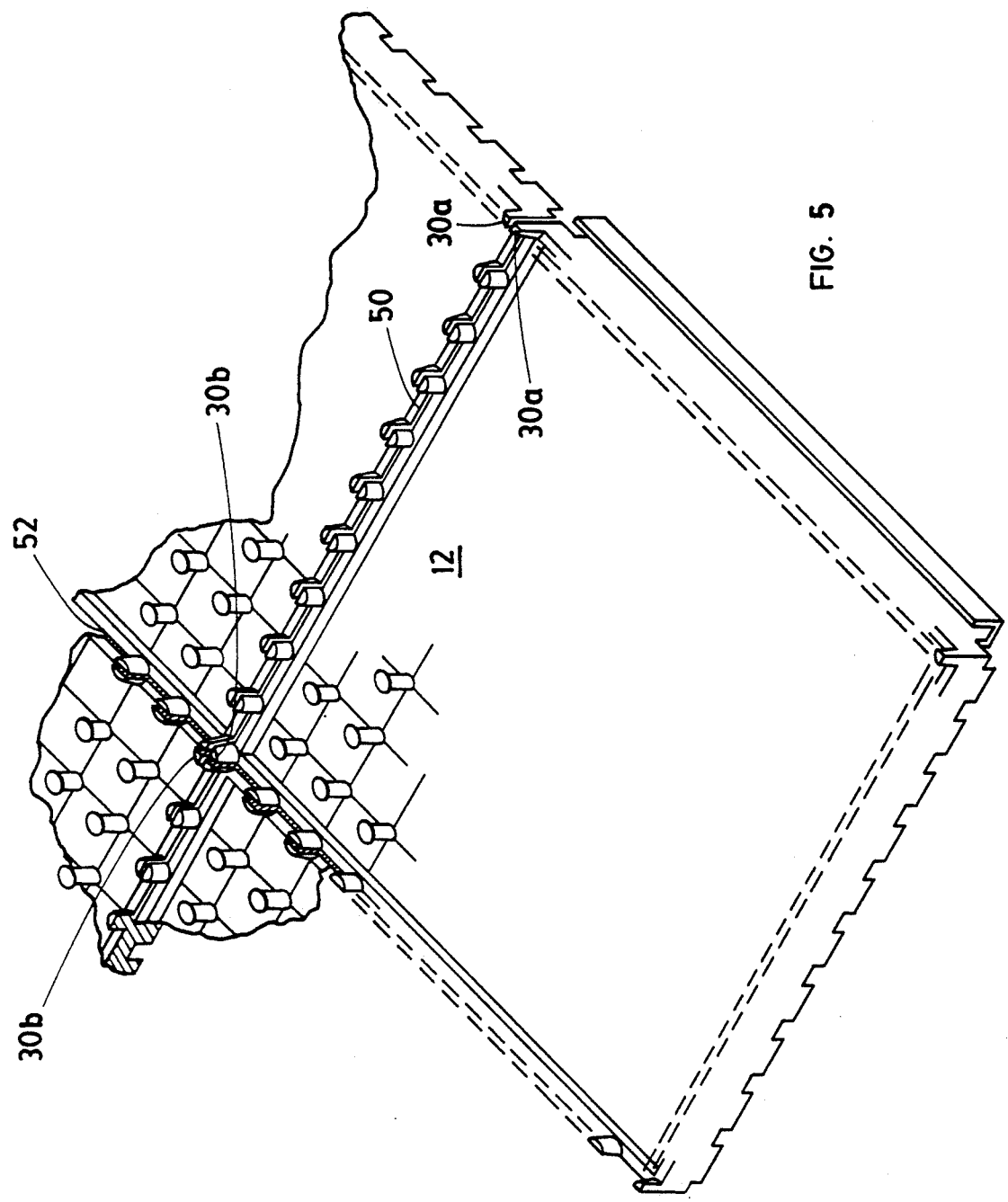
FIG. 5 is a partial isometric view of four of the FIG. 1 boards in side-by-side relationship arranged to form four quadrants of a Cartesian coordinate system.
Figure 6:
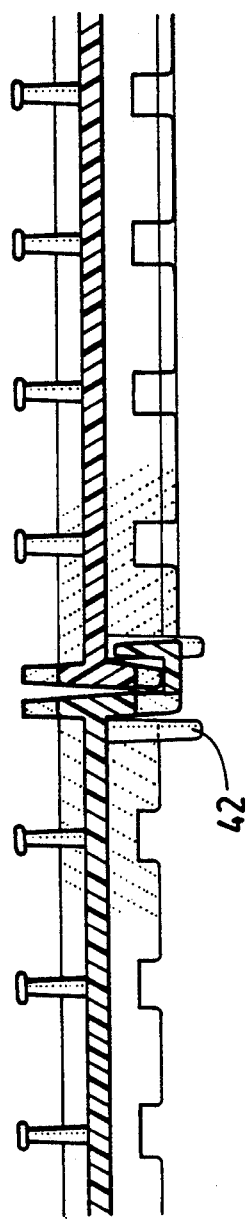
FIG. 6 is a partial section showing a pair of geometry boards assembled in side-by-side relationship.

Edges posts or pegs 26 are aligned along each edge of the board and located at the corners thereof. The edge posts are located such that when a pair of boards is assembled in side-by-side relationship with edges of the boards adjacent and coextensive with each other, as shown in FIGS. 5 and 6, pairs of edge posts are also located in side-by-side relationship. This is so that when a pair of boards are so assembled, the paired edge posts act as a single post, i.e., an elastic band may be wrapped around the paired edge posts as though the pair of edge posts were a single post such as those located in the central area of the board.

Edge pegs 26 are also shaped so as to give the appearance of a single post. Edge posts 26 located on a single edge of the board are in the shape of half-cylinders 28 while edge posts located at the corners of the board are in the shape of quarter-cylinders 30. Flat faces 32 run upwardly of the board face and are parallel with and blend with downwardly depending walls 34. Paired half-cylinders approximately form a single cylinder when boards are paired side-by-side, as shown in FIG. 5. Quarter-cylinders 30a may also act as a single post when paired as shown in FIG. 5. Paired edge posts are thus complementarily shaped to each other. Each quarter-cylinder 30b located at a corner of the board may act with three other quarter cylinders 30b to approximately form a single cylinder, i.e., post, when four boards are arranged side-by-side as shown in FIG. 5.

Figure 4:
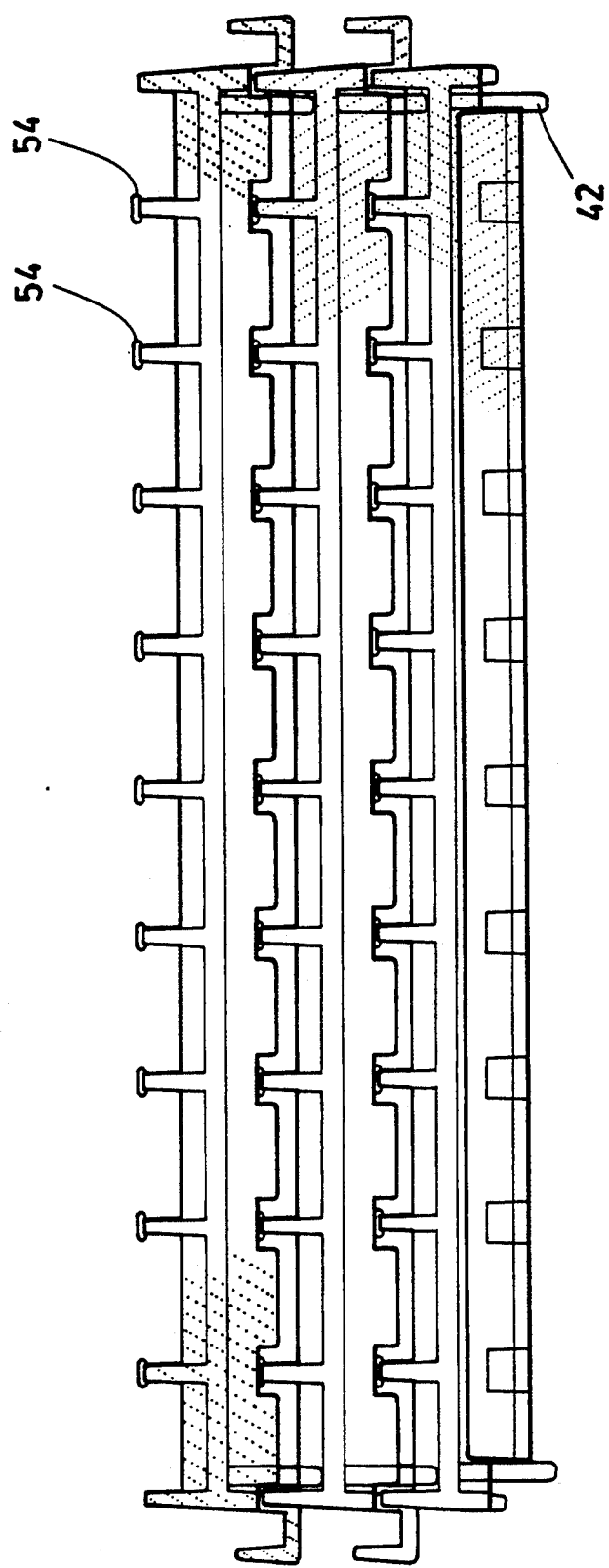
FIG. 4 is a side elevation of three of the boards in stacked relationship.

Walls 34, 36 depend downwardly from each edge of the board face. Lower edge 38 of each wall is crenelated, i.e., it is shaped with indentations 40, each of which accommodates an upstanding edge post when one board is stacked upon another with edges aligned, as shown in FIG. 4. In such a stacked position, an overlying board is supported on an underlying board by downwardly depending legs 42 located slightly inwardly of the corners of each board so as to abut against the corresponding corner edge post of the underlying board. It will be noted that underlying and overlying boards may be similarly oriented as with the two uppermost boards shown in FIG. 4. Underlying and overlying boards may be rotated 90° with respect to each other as the middle and nethermost boards shown in FIG. 4.

Walls 36, located at opposite or parallel edges of the board, have further portions 44, 46 which extend laterally outwardly and upwardly, respectively, of the board to form upwardly directed trough 48 for receipt of wall 34 of another board. Pairs of boards may thus be assembled in side-by-side relationship as shown in FIG. 5 with wall 32 received within trough 48 as shown in greater detail in FIG. 6.

The preferred embodiment board is of translucent injection-molded plastic. The board may thus be used in conjunction with an overhead projector for group demonstrations. A board with one or more figures outlined by elastics may be placed directly on the screen of a projector for projection of an image onto a large screen. Further, another board may be place upon a first board to demonstrate translations of figures such as rotations, etc.

A particular advantage of the preferred embodiment board is its amenability to assembly with other boards in side-by-side relationship as shown in FIG. 5 and 6. FIG. 6 shows what is essentially a Cartesian coordinate system having x-axis 50 and y-axis 52 coincident with adjacent edges of side-by-side boards. Points along the x- and y-axes are provided by paired edge posts, including the origin which is provided by the four central quarter-cylinder edge posts 30b. The four corner edge posts at the origin of the coordinate system are mutually adjacent so as to form a single cylinder having coordinates (0,0) in the Cartesian system. It will thus be appreciated that the edge posts or pegs arranged along the edges of a lone board can act as posts in that elastic bands can be wrapped around single edge posts, but that when paired beside each other an elastic can be wrapped around such a pair just as in the case of a single post. Further, edge posts located at the corners of the boards can act as a single post on a lone board, or a pair of side-by-side corner posts can act as a single post when a pair of boards are assembled as shown in FIG. 5; or if three boards are assembled, so as to obtain three of four quadrants of a coordinate system the three corner posts side-by-side act as a single post; and of course when four boards are assembled to obtain all four quadrants the center four posts, which are in side-by-side relationship also act as a single post.

The preferred embodiment is of a geometry board having a square-shaped top face. The invention disclosed herein may be embodied in boards of other polygonal shapes (i.e., planar shapes defined by at least a pair of adjacent straight edges) such as triangular shaped boards, rectangular boards, of which the square board is a particular type, etc.

It will further be appreciated that the disclosed geometry board may be used for demonstration purposes with an overhead-type of projector, by individual students, alone or in combination with other boards. Students may use a board individually and then assemble it with boards used by other students, etc.

It will of course be appreciated that assembly of boards to form a coordinate system is not limited to four of the disclosed boards. Several more boards could be added on as desired.

The disclosed board is of injection-molded plastic. The central posts, having mushroom heads 54 are initially formed cylindrically-shaped and taller than the edge posts. The top portions of the taller cylinders are simultaneously hot pressed down to form mushroom-shaped cylinders of about the same height as the edge posts.

It will further be appreciated that the stacking arrangement of FIG. 4 permits convenient storage of the boards.

Embodiments of the invention for which protection is sought are defined by the appended claims.

What is claimed is:

1. A geometry board comprising:
   a polygonal board having a top face;
   a plurality of spaced apart posts permanently affixed to and arranged across the top face;

first and second walls which extend downwardly of first and second adjacent edges of the board, respectively, wherein the first wall extends laterally outwardly and upwardly to form a trough for receipt of the second wall of another board for assembly of a pair of the boards in side-by-side relationship with the first edge of a first or the pair of boards adjacent and coextensive with the second edge of a second of the pair of boards; and wherein the posts include edge pegs arranged along the first and second edges of the board such that when the pair of boards are arranged in the side-by-side relationship, pairs of first and second of the edge pegs of the first and second boards, respectively, are located in side-by-side relationship with each other such that each of the pairs of edge pegs acts as a single post.

2. The geometry board of claim 1, wherein each wall has indentations located to accommodate edge pegs of an underlying board when an overlying board is stacked thereupon with one of said edges of the overlying board located to overly one of said edges of the underlying board.

3. The geometry board of claim 1, wherein the top face of the board is rectangular and said posts are arranged in an array of points located at intersections of first and second sets of parallel lines, the first and second sets of lines being parallel to first and second non-parallel board edges, respectively.

4. The geometry board of claim 1, wherein edge pegs located along the first and second edges of the board are each in the shape of a semi-cylinder such that the first and second edge pegs of each said pair of such edge pegs forms a cylinder when said pair of the boards is arranged in said side-by-side relationship.

5. The geometry board of claim 4, wherein the top face of the board is rectangular and a corner edge peg located at a corner of the board is in the shape of a quarter-cylinder such that, four of the boards may be arranged in said side-by-side relationship with a corner of each board adjacent a corner of each of the other boards such that four corner edge pegs are mutually adjacent so as to form a cylinder.

6. The geometry board of claim 1 wherein the board is a translucent injection-molded plastic.

7. A geometry board comprising:
a polygonal board having a top face;
a plurality of spaced apart posts permanently affixed to and arranged across the top face;
first and second walls which extend downwardly of first and second adjacent edges of the board, respectively, wherein the first wall extends laterally outwardly and upwardly to form a trough for receipt of the second wall of another board for assembly of a pair of the boards in side-by-side relationship with the first edge of a first or the pair of boards adjacent and coextensive with the second edge of a second of the pair of boards; and wherein each wall has indentations located to accommodate edge pegs of an underlying board when an overlying board is stacked thereupon with one of the edges of the overlying board located to overly one of the edges of the underlying board; and
the posts include edge pegs arranged along the first and second edges of the board such that when the pair of boards are arranged in the side-by-side relationship, pairs of first and second of the edge pegs of the first and second boards, respectively, are located in side-by-side relationship with each other such that each of the pairs of edge pegs acts as a single post.

8. The geometry board of claim 7, wherein said posts are arranged in an array of points located at intersections of first and second sets of parallel lines, the first and second sets of lines being parallel to first and second non-parallel board edges, respectively.

9. The geometry board of claim 8 wherein the top face of the board is rectangular.

10. The geometry board of claim 9 wherein the top face of the board is square.

11. The geometry board of claim 7 wherein the first and second edge pegs of each of the pairs of edge pegs are complementarily shaped to each other.

12. The geometry board of claim 11 wherein edge pegs located along the first and second edges of the board are each in the shape of a semi-cylinder such that the first and second edge pegs of each said pair of such edge pegs forms a cylinder when said pair of boards is arranged in said side-by-side relationship.

13. The geometry board of claim 12 wherein a corner edge peg located at a corner of the board is in the shape of a quarter-cylinder such that, four of the boards may be arranged in said side-by-side relationship with a corner of each board adjacent a corner of each of the other boards such that four corner edge pegs are mutually adjacent so as to form a cylinder.

14. A geometry board comprising:
a rectangular board having a top face;
a plurality posts arranged across the top face in an array of points located at intersections of first and second sets of parallel lines; and wherein:
the posts include edge pegs arranged along the first and second adjacent edges of the board such that when the pair of boards are arranged in the side-by-side relationship with the first edge of a first board of the pair adjacent and coextensive with the second edge of a second board of the pair, pairs of first and second of the edge pegs of the first and second boards, respectively, are located in side-by-side relationship with each other such that each of the pairs of edge pegs acts as a single post;
the first set of lines is parallel to the first edge and the second set of lines is parallel to the second edge; and further comprising:
a pair of first walls each of which extends downwardly of parallel first board edges and a pair of second walls each of which extends downwardly of parallel second board edges orthogonal to the first board edges, each wall having indentations to accommodate edge pegs of an underlying board when an overlying board is stacked thereupon with one of said edges of the overlying board located to overly one of said edge of the underlying board and wherein each first wall extends laterally outwardly and upwardly to form a trough for receipt of one of the second walls of another said board for assembly of a pair of the boards when arranged in said side-by-side relationship. pg,20

15. The geometry board of claim 14 wherein the board is of translucent injection-molded plastic.

16. A geometry board comprising:
a translucent plastic injection molded board having a square top face;
upstanding posts arranged in an array of points located at intersections of first and second sets of evenly spaced apart parallel lines, the first and second sets of lines being parallel to first and second orthogonal board edges, respectively;

edge posts arranged along each edge of the board such that when a pair of boards are arranged in side-by-side relationship with one of the edges of a first board of the pair of boards adjacent and coextensive with one of the edges of a second board of the pair of boards, pairs of first and second of the edge posts of the first and second boards, respectively, are located in side-by-side relationship with each other such that each of the pairs of edge posts acts as a single post; and a pair of first walls, each of which walls extends downwardly of each of parallel first board edges, respectively, and a pair of second walls, each of which walls extends downwardly of parallel second board edges orthogonal to the first board edges, respectively, each wall having indentations to accommodate edge posts of an underlying board when an overlying board is stacked thereupon with one of said edges of the overlying board located to overly one of said edges of the underlying board and wherein each first wall extends laterally outwardly and upwardly to form a trough for receipt of one of the second walls of another said board for assembly of a pair of the boards when arranged in said side-by-side relationship.

* * * * *